(12) United States Patent
Kawaguchi et al.

(10) Patent No.: US 12,179,395 B2
(45) Date of Patent: Dec. 31, 2024

(54) RESIN SUPPLY APPARATUS, RESIN SEALING APPARATUS, AND METHOD FOR MANUFACTURING RESIN-SEALED PRODUCT

(71) Applicant: APIC YAMADA CORPORATION, Nagano (JP)

(72) Inventors: Makoto Kawaguchi, Nagano (JP); Masahiko Fujisawa, Nagano (JP); Yoshikazu Muramatsu, Nagano (JP); Minoru Hanazato, Nagano (JP)

(73) Assignee: APIC YAMADA CORPORATION, Nagano (JP)

( * ) Notice: Subject to any disclaimer, the term of this patent is extended or adjusted under 35 U.S.C. 154(b) by 71 days.

(21) Appl. No.: 17/489,806

(22) Filed: Sep. 30, 2021

(65) Prior Publication Data

US 2022/0152887 A1    May 19, 2022

(30) Foreign Application Priority Data

Nov. 17, 2020    (JP) ................................. 2020-191052

(51) Int. Cl.
*B29C 43/34*    (2006.01)
*B29C 43/18*    (2006.01)
(Continued)

(52) U.S. Cl.
CPC .............. *B29C 43/34* (2013.01); *B29C 43/18* (2013.01); *B29C 43/58* (2013.01);
(Continued)

(58) Field of Classification Search
None
See application file for complete search history.

(56) References Cited

U.S. PATENT DOCUMENTS

| 7,868,957 B2* | 1/2011 | Yamazaki | H01L 29/78678 |
| | | | 438/158 |
| 2022/0152888 A1* | 5/2022 | Kawaguchi | B29C 33/10 |

FOREIGN PATENT DOCUMENTS

| JP | 2003165133 | 6/2003 | |
| JP | 2003165133 A * | 6/2003 | ............. B29C 43/18 |

(Continued)

OTHER PUBLICATIONS

Machine translation of Yoshifumi_JP_2018065335_A_I (Year: 2018).*

(Continued)

*Primary Examiner* — Robert J Grun
(74) *Attorney, Agent, or Firm* — JCIPRNET

(57) ABSTRACT

A resin supply apparatus, a resin sealing apparatus, and a method for manufacturing a resin-sealed product are provided. A resin supply apparatus supplies a resin onto a workpiece on which elements are arranged in a first direction and a second direction intersecting the first direction, respectively. The resin supply apparatus includes: an acquisition unit for acquiring arrangement information of the elements on the workpiece; a supply unit for supplying the resin onto the workpiece; a calculation unit for calculating a resin supply pattern based on the arrangement information; and a drive unit for moving at least one of the workpiece and the supply unit relative to the other along the resin supply pattern. The resin supply pattern has linear paths extending along the first direction, and a region between the mutually adjacent linear paths in the plurality of linear paths is opened to the outside of the workpiece.

14 Claims, 14 Drawing Sheets

(51) Int. Cl.
*B29C 43/58* (2006.01)
*B29L 31/34* (2006.01)
(52) U.S. Cl.
CPC ............... *B29C 2043/3433* (2013.01); *B29C 2043/5875* (2013.01); *B29L 2031/34* (2013.01)

(56) References Cited

FOREIGN PATENT DOCUMENTS

| | | |
|---|---|---|
| JP | 2017209903 | 11/2017 |
| JP | 2018065335 | 4/2018 |
| JP | 2018134846 | 8/2018 |

OTHER PUBLICATIONS

Machine translation JP-2003165133-A (Year: 2003).*
Office Action of China Counterpart Application, with partial English translation thereof, issued on Mar. 29, 2024, pp. 1-20.

* cited by examiner

RESIN SUPPLY APPARATUS, RESIN SEALING APPARATUS, AND METHOD FOR MANUFACTURING RESIN-SEALED PRODUCT

CROSS-REFERENCE TO RELATED APPLICATIONS

This application claims the priority benefit of Japanese Patent Application No. 2020-191052, filed on Nov. 17, 2020. The entirety of the above-mentioned patent application is hereby incorporated by reference herein and made a part of this specification.

BACKGROUND

Technical Field

The present invention relates to a resin supply apparatus, a resin sealing apparatus, and a method for manufacturing a resin-sealed product.

Related Art

It is known that a workpiece is resin-sealed by compression molding. A resin sealing apparatus using the compression molding generally includes a resin supply apparatus for supplying a resin onto a workpiece, and a resin sealing mold that spreads the resin on the workpiece and heats and pressurizes the resin.

Here, Patent literature 1 discloses that a resin supply pattern supplied by the resin supply apparatus is formed in a spiral shape or a lattice shape in a vacuum chamber.

LITERATURE OF RELATED ART

Patent Literature

Patent literature 1: Japanese Patent Laid-Open No. 2018-134846

However, even when the resin is supplied in the vacuum chamber as in the resin supply apparatus described in Patent literature 1, if air or gas generated from the resin is present in a mold for molding, the air or gas may be caught in the resin, which may cause defects such as air traps or voids caused by poor filling.

SUMMARY

The present invention provides a resin supply apparatus, a resin sealing apparatus, and a method for manufacturing a resin-sealed product, which can suppress occurrence of defects.

A resin supply apparatus according to one aspect of the present invention is a resin supply apparatus for supplying a resin onto a workpiece on which elements are arranged in a first direction and a second direction intersecting the first direction, respectively. The resin supply apparatus includes: an acquisition unit for acquiring arrangement information of the elements on the workpiece; a supply unit for supplying a resin onto the workpiece; a calculation unit for calculating a resin supply pattern based on the arrangement information; and a drive unit for moving at least one of the workpiece and the supply unit relative to the other along the resin supply pattern. The resin supply pattern has a plurality of linear paths extending along the first direction, and a region between mutually adjacent linear paths in the plurality of linear paths is opened to the outside of the workpiece.

A resin sealing apparatus according to one aspect of the present invention includes the resin supply apparatus according to any one of the above aspects, and a resin sealing mold for sealing the elements on the workpiece with resin. The resin sealing mold has an upper mold provided with a cavity in which a resin is filled and a lower mold in which the workpiece is set, and the clamped resin sealing mold has a plurality of air vents for discharging air inside the cavity between the upper mold and the lower mold.

A method for manufacturing a resin-sealed product according to one aspect of the present invention includes supplying a resin onto a workpiece on which elements are arranged in a first direction and a second direction intersecting the first direction, respectively. In this method for manufacturing a resin-sealed product, the supply of a resin onto the workpiece includes: acquiring arrangement information of the elements on the workpiece; calculating a resin supply pattern based on the arrangement information; and supplying the resin onto the workpiece along the resin supply pattern. The resin supply pattern has a plurality of linear paths extending along the first direction, and a region between mutually adjacent linear paths in the plurality of linear paths is opened to the outside of the workpiece.

A resin supply apparatus according to one aspect of the present invention is a resin supply apparatus for supplying, onto a release film, a resin used for sealing a workpiece on which elements are arranged in a first direction and a second direction intersecting the first direction, respectively. The resin supply apparatus includes: an acquisition unit for acquiring arrangement information of the elements on the workpiece; a supply unit for supplying a resin onto the release film; a calculation unit for calculating a resin supply pattern based on the arrangement information; and a drive unit for moving at least one of the release film and the supply unit relative to the other along the resin supply pattern. The resin supply pattern has a plurality of linear paths extending along the first direction, and a region between mutually adjacent linear paths in the plurality of linear paths is opened to the outside of the release film.

A resin sealing apparatus according to one aspect of the present invention includes the resin supply apparatus according to the above aspect and a resin sealing mold for sealing the elements on the workpiece with resin. The resin sealing mold has a lower mold in which a cavity for filling a resin therein is arranged and the release film is set, and an upper mold in which the workpiece is set, and air vents for discharging air in the cavity are formed between the upper mold and the lower mold.

A method for manufacturing a resin-sealed product according to one aspect of the present invention includes supplying, onto a release film, a resin used for sealing a workpiece on which elements are arranged in a first direction and a second direction intersecting the first direction, respectively. In this method for manufacturing a resin-sealed product, the supplying of the resin onto the release film includes: acquiring arrangement information of the elements on the workpiece; calculating a resin supply pattern based on the arrangement information; supplying the resin onto the release film along the resin supply pattern; and pressing the resin on the release film against the workpiece. The resin supply pattern has a plurality of linear paths extending along the first direction, and a region between the mutually adjacent linear paths in the plurality of linear paths is opened to the outside of the workpiece.

DESCRIPTION OF THE EMBODIMENTS

Hereinafter, embodiments of the present invention are described with reference to the drawings. The drawings of each embodiment are for purposes of illustration, the dimensions and shape of each part are schematically shown, and the technical scope of the present invention should not be interpreted as being limited to the embodiments.

First Embodiment

Figure 1:
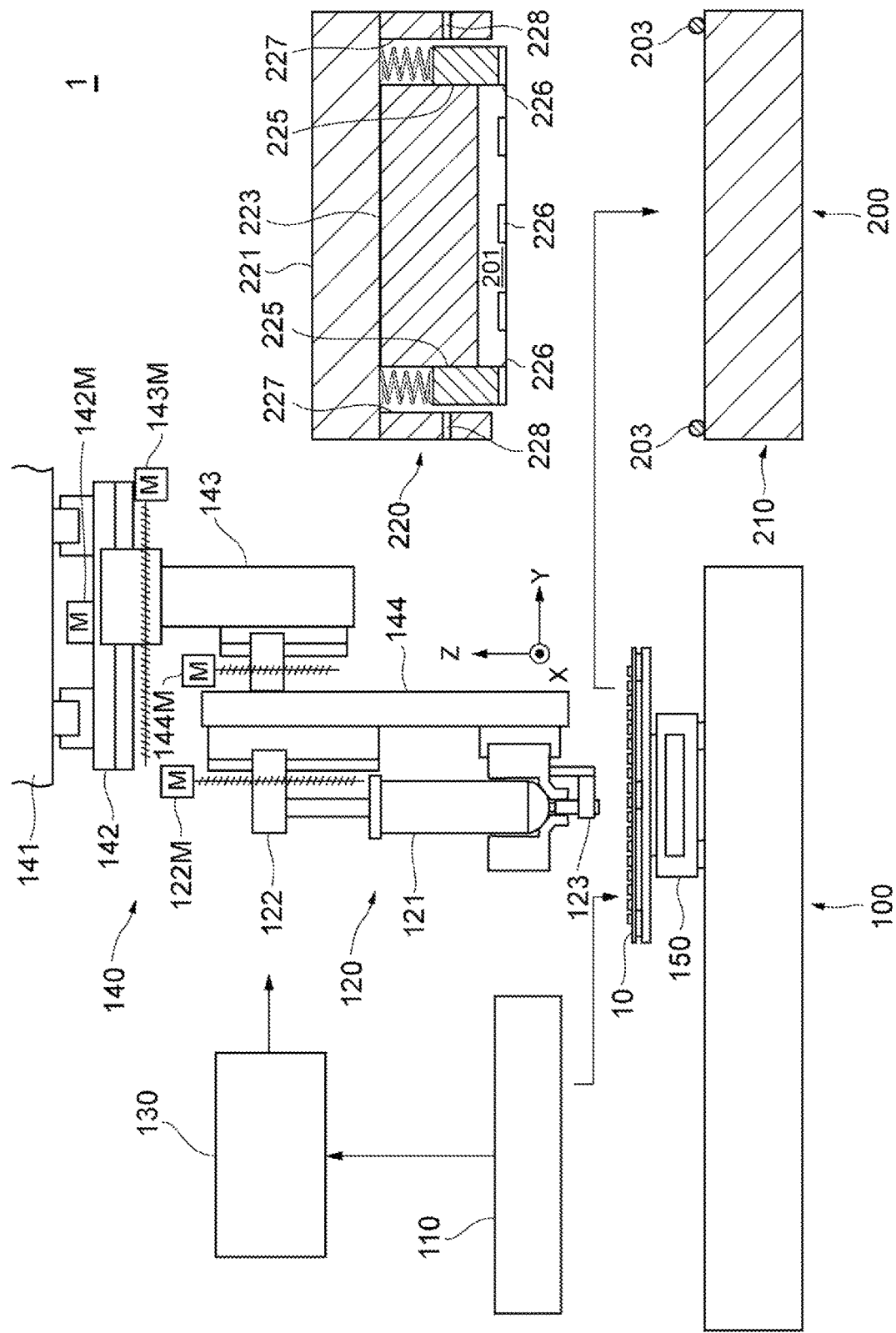
FIG. 1 is a diagram schematically showing a configuration of a resin sealing apparatus according to a first embodiment.
Figure 2:
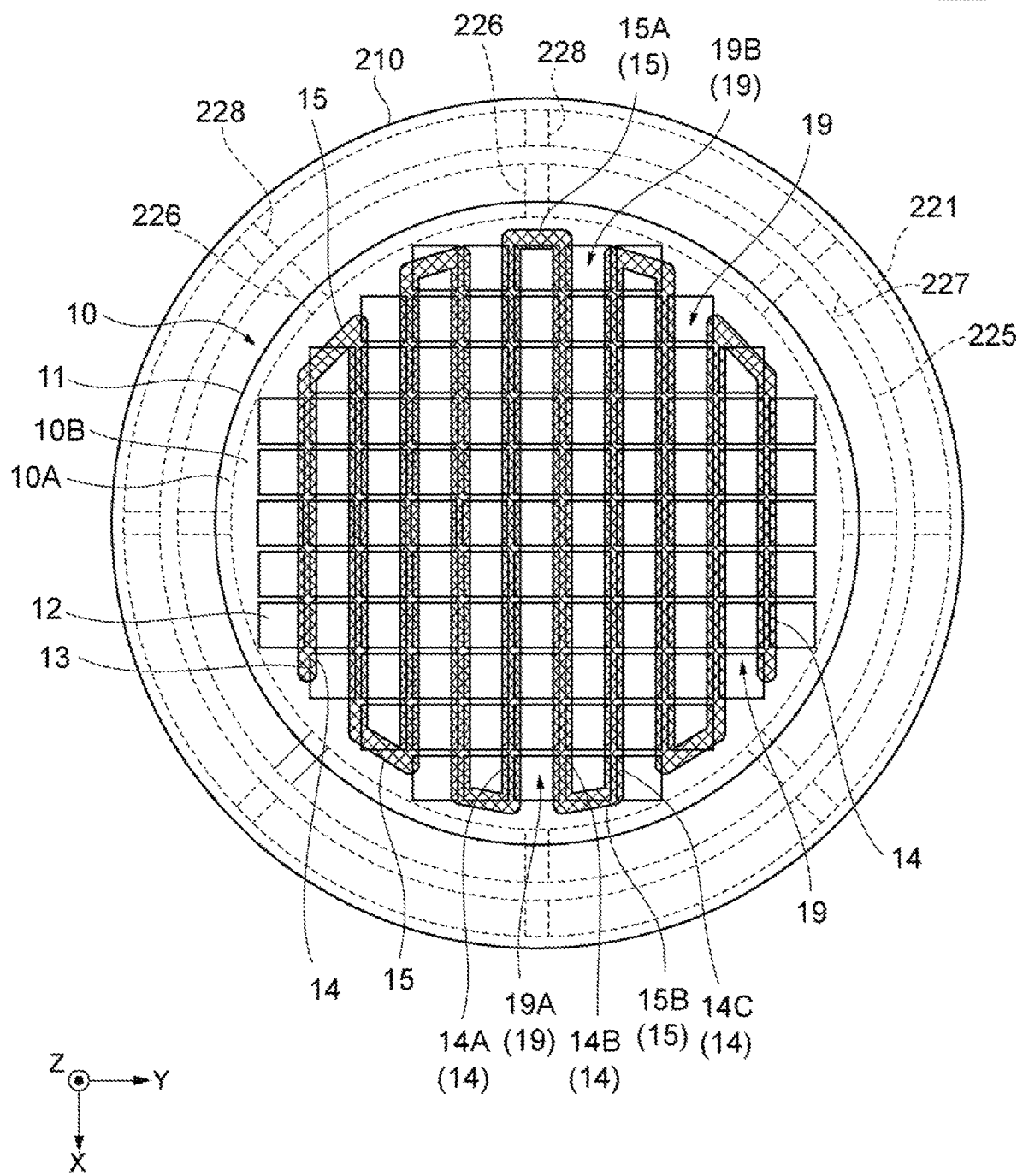
FIG. 2 is a plan view schematically showing a workpiece and a resin supply pattern in a resin sealing mold.

A configuration of a resin sealing apparatus 1 according to an embodiment of the present invention is described with reference to FIGS. 1 and 2. FIG. 1 is a diagram schematically showing a configuration of a resin sealing apparatus according to a first embodiment. FIG. 2 is a plan view schematically showing a workpiece and a resin supply pattern in a resin sealing mold.

Each drawing may be assigned with a Cartesian coordinate system including X-axis, Y-axis and Z-axis for convenience to clarify the relationship between the drawings and to help understand the positional relationship between members. The direction of the Z-axis arrow is an upward direction, and the direction opposite to the direction of the Z-axis arrow is a downward direction.

The resin sealing apparatus 1 is an apparatus used for resin-sealing (molding) a workpiece 10 with a resin 13. The resin sealing apparatus 1 includes a resin supply apparatus 100 that applies (supplies) the resin 13 for resin sealing onto an object to be coated (for example, the workpiece 10 or a release film RF), and a resin sealing mold 200 that heats and pressurizes the resin for curing. The workpiece 10 includes, for example, a substrate 11 and elements 12 arranged on the substrate 11, and the elements 12 are arranged in a first direction X and a second direction Y, respectively.

The configurations of the substrate 11 and the element 12 are not limited. As an example, the substrate 11 may be a semiconductor wafer, and the element 12 may be a semiconductor chip flip-chip mounted on the substrate 11. In this case, a gap is present between the substrate 11 and the element 12 when the resin 13 is supplied, but the resin is filled in this gap by heating and pressurizing. The present invention is not limited to this aspect, and may also be applied when, for example, the element 12 is simply mounted on the substrate 11 without a gap therebetween, or when an underfill resin is filled between the substrate 11 and the element 12. In addition, the element 12 may be a multilayer body in which a plurality of semiconductor chips are laminated at intervals in a third direction Z, or may be an element other than a semiconductor element (MEMS device, electronic device, or the like). The arrangement of the element 12 on the substrate 11 is not limited. For example, the element 12 may be wire-bonded to the substrate 11, or may be detachably fixed to the substrate 11. The substrate 11 may be a resin substrate or a glass substrate, or may be an interposer substrate, a lead frame, a carrier plate with an adhesive sheet or the like. In a plan view of the workpiece 10 from a positive direction (hereinafter referred to as "upward direction") of the third direction Z, for example, the planar shape of the substrate 11 is circular and the planar shape of the element 12 is rectangular, but the planar shapes of the substrate 11 and the element 12 are not limited thereto. For example, the planar shape of the substrate may be rectangular, and the planar shape of the element may be polygonal or circular. Two or more types of elements having different shapes may be arranged on the workpiece.

The resin supply apparatus 100 includes: an acquisition unit 110 for acquiring arrangement information of the element 12 on the workpiece 10 (more specifically, the substrate 11); a supply unit 120 for supplying a resin onto the workpiece; a calculation unit 130 for calculating a resin supply pattern based on the arrangement information; a drive unit 140 for moving the supply unit 120 along the resin supply pattern; and a stage 150 on which the workpiece 10 is placed.

For example, the acquisition unit 110 acquires the arrangement information of the elements 12 by imaging the workpiece 10 and analyzing the image of the workpiece. The acquisition unit 110 may acquire the arrangement information for each workpiece, or may acquire the arrangement information for each lot having a plurality of workpieces. Note that, the method for acquiring the arrangement information is not limited to the above method, and for example, the acquisition unit 110 may read a code or the like assigned to the workpiece 10, and thereby acquire arrangement information corresponding to the code or the like from a database recorded in advance. In addition, the acquisition unit 110 may acquire the arrangement information by inputting from an external terminal or the like. Additionally, the acquisition unit 110 may detect a position of a V notch or the like in the workpiece 10 such as a wafer to acquire the orientation of the workpiece 10. The resin supply apparatus 100 can also supply the resin 13 described later after adjusting the orientation of the workpiece 10 based on the orientation of the workpiece 10 acquired by the acquisition unit 110.

The supply unit 120 is, for example, a dispenser for discharging the liquid resin 13. The supply unit 120 includes a syringe 121 in which the resin 13 is stored, a pusher (piston) 122 that is inserted inside the syringe 121 and can push out the resin 13, and a pinch valve 123 that opens or closes a nozzle at the front end of the syringe 121. The supply unit 120 is provided with a configuration in which the used syringe 121 can be replaced with a new syringe 121 when the resin 13 stored in the syringe 121 is used up. Note that, the supply unit 120 is not limited to the above configuration, and may include a switching valve instead of the pinch valve 123. In addition, the supply unit 120 may be configured to prepare two liquids separately and mix and supply them on site. For example, the supply unit 120 may be a feeder for discharging powdery and granular resin.

The resin supply pattern (the shape of the resin 13 drawn on the workpiece 10) calculated by the calculation unit 130 has a plurality of linear paths 14 extending along the first direction X and relay paths 15 arranged in the second direction Y and connecting the mutually adjacent linear paths 14 in a plurality of the linear paths 14. As shown in FIG. 2, in a plan view of the workpiece 10 from above, a region 19 between the mutually adjacent linear paths 14 in the plurality of linear paths 14 is opened to the outside of the workpiece 10. Moreover, the plurality of linear paths 14 extend parallel to, for example, the first direction X. Alternatively, the plurality of linear paths 14 may be inclined with respect to the first direction X.

The resin supply pattern is described by taking a first linear path 14A, a second linear path 14B adjacent to the first linear path 14A, and a third linear path 14C adjacent to the second linear path 14B as examples. On one end side (negative direction side) of the first direction X, the first linear path 14A is connected to the second linear path 14B by a first relay path 15A. The first linear path 14A and the second linear path 14B are only connected by the first relay path 15A, and in a plan view of the workpiece 10 from above, a region 19A between the first linear path 14A and the second linear path 14B is opened to the outside of the workpiece 10 on the other end side (positive direction side) of the first direction X. On the other end side of the first direction X, the second linear path 14B is connected to the third linear path 14C by a second relay path 15B, and a region 19B between the second linear path 14B and the third linear path 14C is opened to the outside of the workpiece 10 on one end side of the first direction X. The resin 13 can be supplied with one stroke along the first linear path 14A, the first relay path 15A, the second linear path 14B, the second relay path 15B, and the third linear path 14C. Moreover, the resin supply pattern is one continuous linear line, and the resin 13 can be supplied with one stroke even in the entire resin supply pattern. In other words, the resin supply pattern is formed as a linear pattern by repeatedly folding back the parallel linear paths 14 so as to make the parallel linear paths 14 to be connected at the relay path 15.

In the illustrated example, the resin 13 is supplied along the linear path 14 so as to fill gaps in the second direction Y of the elements 12 arranged in a matrix shape in the first direction X (up-down direction in FIG. 2) and the second direction Y (left-right direction in FIG. 2). Therefore, the left side portion of the linear path 14 is arranged to cover the right end of the elements 12 located on the left side of the linear path 14. In addition, the right side portion of the linear path 14 is arranged to cover the left end of the elements 12 located on the right side of the linear path 14.

In FIG. 2, the elements 12 are arranged vertically, and the upper element 12 and the lower element 12 are arranged close to the outermost edge of the workpiece 10. In the following description, a region from an edge of the substrate 11 to the upper element 12 in the figure and a region from an edge of the substrate 11 to the lower element 12 in the figure are collectively referred to as an "external region of the workpiece 10". In the external region of the workpiece 10, a region sandwiched by the resin sealing mold 200 is referred to as "external region 10A", and a region closer to the element 12 side than the external region 10A is referred to as "external region 10B".

Each linear path 14 extends from the upper element 12 in the figure to the lower element 12 in the figure. Therefore, the relay path 15 that connects the end portions of the adjacent linear paths 14 is arranged so as to overlap the upper element 12 in the figure or the lower element 12 in the figure. The relay path 15 on the upper side in the figure may be arranged in the external region 10B on the upper side of the upper element 12 in the figure. The relay path 15 on the lower side in the figure may be arranged in the external region 10B on the lower side in the figure of the lower element 12 in the figure.

Note that, the resin supply pattern is not limited to the illustrated example. For example, the region in which the linear path 14 can be arranged is not limited to the gap between the elements 12. The linear path 14 may be arranged so as to pass through both the gap between the elements 12 and the center of the main surface of the elements 12, or may be arranged only in the center of the main surface of the elements 12. In addition, the region in which the relay path 15 can be arranged is not limited to the upper element 12, the lower element 12, and the external region 10B in the figure. A part or all of the relay path 15 may be arranged on the inner elements 12 between the upper end element 12 and the lower end element 12.

A corner portion of the resin supply pattern may have a sharp shape or an R shape.

The drive unit 140 moves at least one of the workpiece 10 and the supply unit 120 relative to the other along the resin supply pattern. In the embodiment, the drive unit 140 moves the supply unit 120. Specifically, the drive unit 140 includes an upper base portion 141, a first motor 142M, a first moving portion 142, a second motor 143M, a second moving portion 143, a third motor 144M, a third moving portion 144, and a fourth motor 122M.

The first moving portion 142 is configured to be movable in the first direction X relative to the upper base portion 141, the second moving portion 143 is configured to be movable in the second direction Y relative to the first moving portion 142, and the third moving portion 144 is configured to be movable in the third direction Z relative to the second moving portion 143. Specifically, the upper base portion 141 has a rail, and the first moving portion 142 has a slider that slides on the rail of the upper base portion 141 by being driven by the first motor 142M. The first moving portion 142 has a rail, and the second moving portion 143 has a slider that slides on the rail of the first moving portion 142 by being driven by the second motor 143M. The second moving portion 143 has a rail, and the third moving portion 144 has a slider that slides on the rail of the second moving portion 143 by being driven by the third motor 144M. The syringe 121 of the supply unit 120 is fixed to the third moving portion 144. The third moving portion 144 has a rail, and a pusher 122 of the supply unit 120 has a slider that slides on the rail of the third moving portion 144 by being driven by the fourth motor 122M. That is, the first motor 142M controls the moving amount and moving speed of the supply unit 120 in the first direction X, the second motor 143M controls the moving amount and moving speed of the supply unit 120 in the second direction Y, and the third motor 144M controls the moving amount and moving speed of the supply unit 120 in the third direction Z. Besides, the fourth motor 122M controls the discharge amount and discharge speed of the resin 13 from the supply unit 120 by controlling the moving amount and moving speed of the pusher 122.

Moreover, in the present embodiment, the workpiece 10 is fixed during the supply of the resin 13. Alternatively, the drive unit 140 may fix the supply unit 120 and move the stage 150 on which the workpiece 10 is placed relative to the supply unit 120. The drive unit 140 may move both the workpiece 10 and the supply unit 120.

The stage 150 includes, for example, a weighing scale. The resin supply apparatus 100 supplies the resin 13 while measuring, by the weighing scale of the stage 150, the weight of the resin 13 supplied onto the workpiece 10. Specifically, the drive of the first motor 142M to the fourth motor 122M of the drive unit 140 is changed based on the weighing result of the weighing scale. With the above configuration, the resin 13 can be supplied onto the workpiece 10 in an arbitrary shape and in an arbitrary amount by moving the syringe 121 at an arbitrary moving speed while supplying the resin 13 at an arbitrary discharge speed. For example, if the moving speed in the first direction X and the second direction Y is increased, the amount of supply within a predetermined length can be reduced even at the same discharge speed, and if the moving speed in the first direction X and the second direction Y is decreased, the amount of supply within a predetermined length can be increased even at the same discharge speed.

The resin sealing mold 200 includes a pair of molds (a lower mold 210 and an upper mold 220) for sealing the workpiece 10 with resin by using compression molding technique. In the present embodiment, the resin sealing mold 200 has an upper mold cavity structure in which a cavity 201 is arranged in the upper mold 220. In addition, the resin sealing mold 200 includes a sealing ring 203 (for example, an O-ring) for sealing the inside of the resin sealing mold 200 (the space between the lower mold 210 and the upper mold 220). Moreover, although not shown, the resin sealing apparatus 1 includes a pressure adjusting portion (for example, a vacuum pump) for adjusting the internal pressure of the resin sealing mold 200, and a temperature adjusting portion (for example, a heater) for adjusting the internal temperature (molding temperature).

The upper mold 220 includes a chase 221, a cavity piece 223, a clamper 225 surrounding the cavity piece 223, and a chamber block 227 surrounding the clamper 225 at an interval. The cavity piece 223 is fixed to the chase 221. The clamper 225 protrudes from the cavity piece 223 toward the lower mold 210 and constitutes the cavity 201 together with the cavity piece 223. The clamper 225 is connected to the chase 221 via a spring and is configured to be slidable with respect to the cavity piece 223. When the mold is clamped, the external region 10A of the workpiece 10 is sandwiched between the clamper 225 and the lower mold 210. On the lower surface of the clamper 225 (the surface facing the lower mold 210), a plurality of recessed air vents 226 that connect the space on the chamber block 227 side and the cavity 201 are arranged. The plurality of air vents 226 extend radially around the cavity 201. The air in the cavity 201 is discharged through the air vents 226 between the clamped upper mold 220 and lower mold 210. Note that, in each drawing, the air vent 226 is illustrated as having a deep depth for the sake of understanding, but in fact, the air vent 226 is formed to have a depth (for example, about several micrometres) at which the air or gas in the mold is discharged but the resin 13 does not flow out. Exhaust holes 228 connected to a pump to discharge air in the cavity 201 are arranged in a portion of the chamber block 227. The exhaust holes 228 of the chamber block 227 extend radially around the cavity 201. The sealing ring 203 is sandwiched between the chamber block 227 and the lower mold 210.

In the clamped resin sealing mold 200, at least one of the plurality of air vents 226 may be arranged on an extension line of the region 19 between the mutually adjacent linear paths 14 in the plurality of linear paths 14. For example, as shown in FIG. 2, the air vents 226 are arranged on an extension line of the region 19A between the first linear path 14A and the second linear path 14B.

Figure 3:
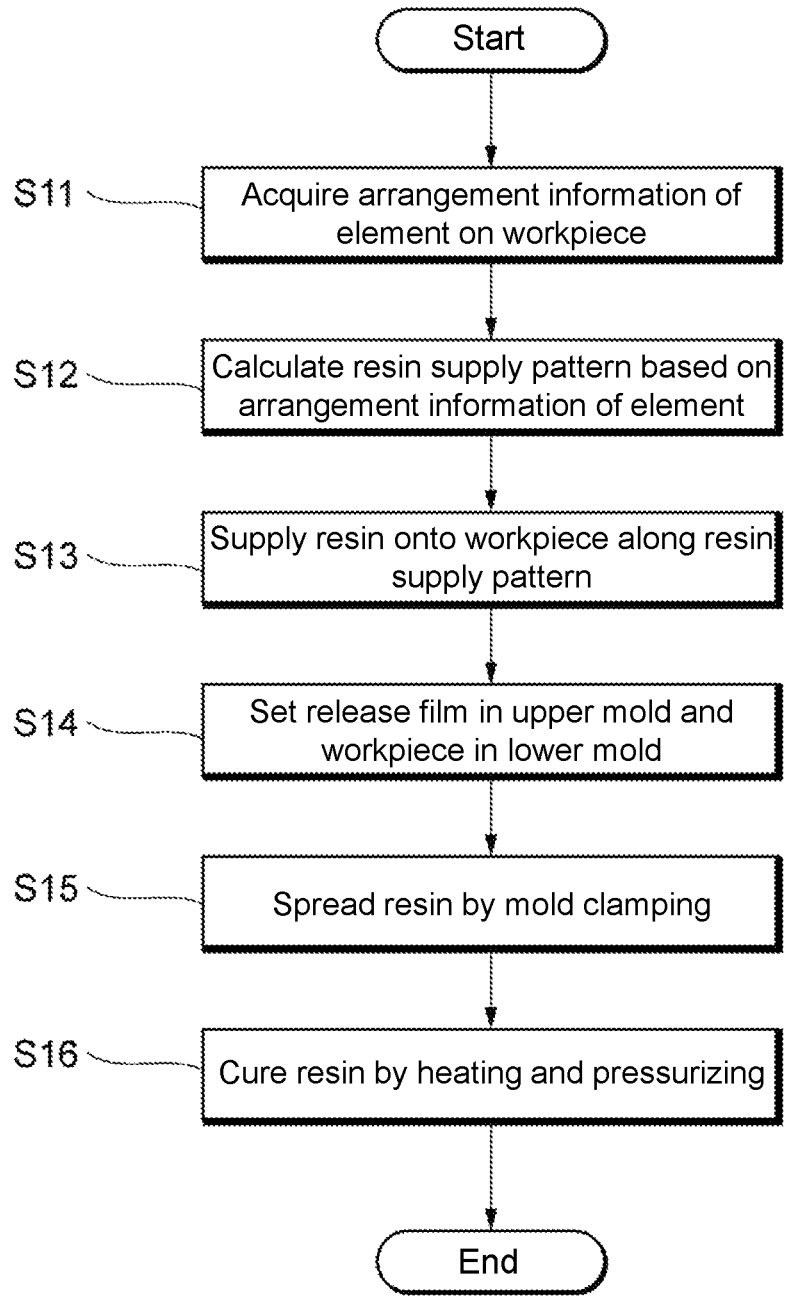
FIG. 3 is a flowchart showing a method for manufacturing a resin-sealed product using the resin sealing apparatus according to the first embodiment.
Figure 4:
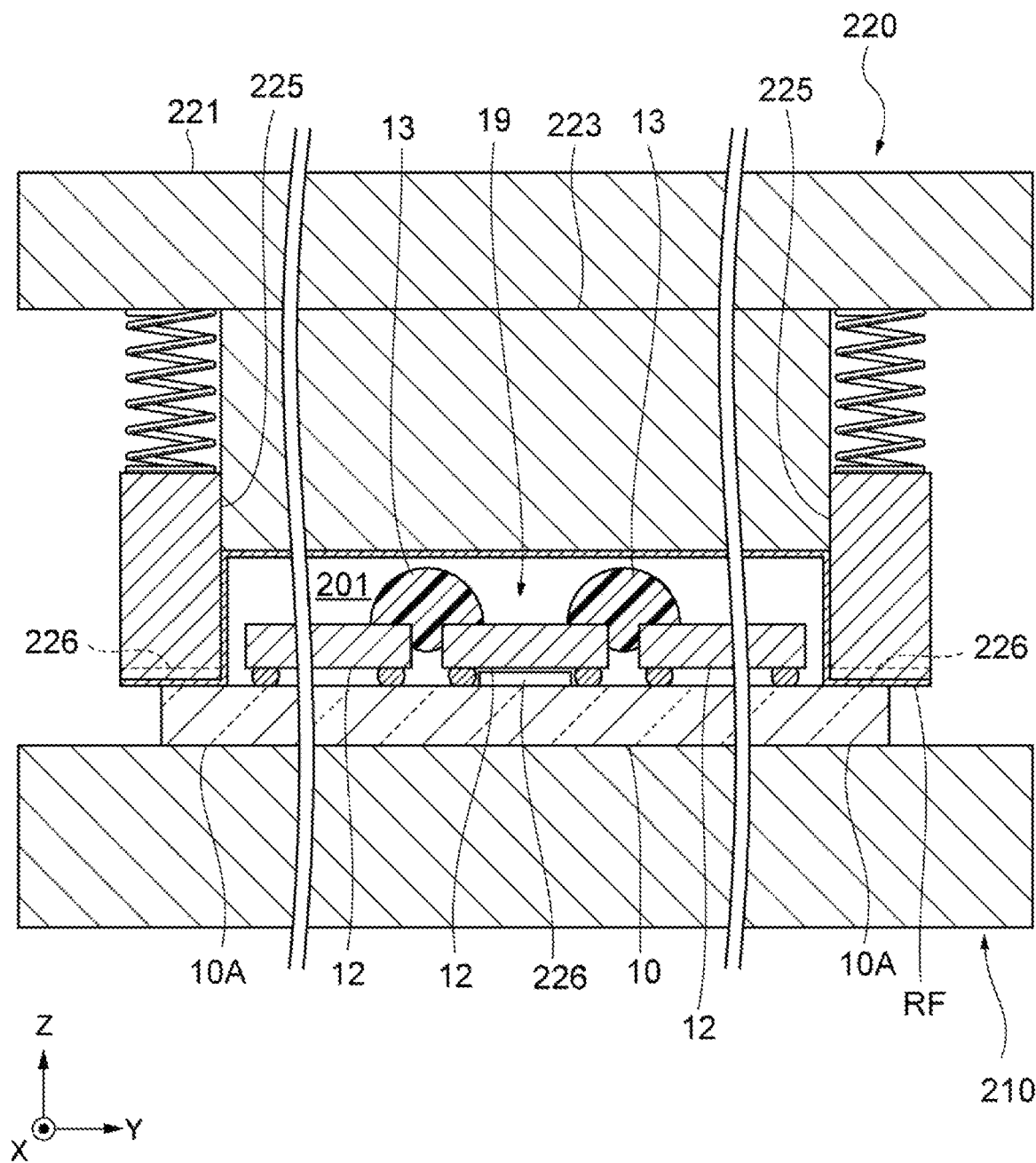
FIG. 4 is a cross-sectional view schematically showing a resin on a workpiece immediately after being set inside the resin sealing mold.
Figure 5:
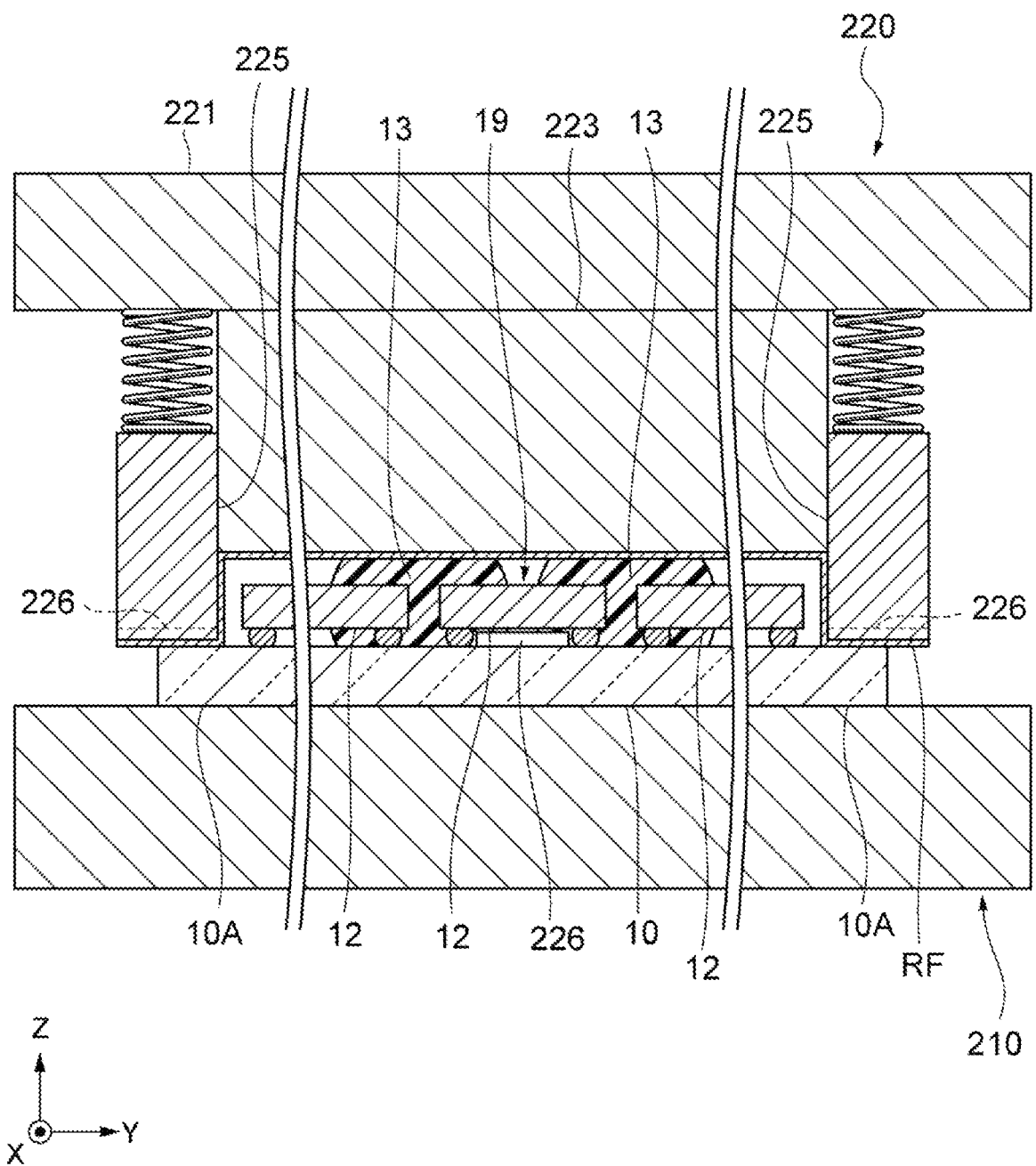
FIG. 5 is a cross-sectional view schematically showing a resin being spread by the resin sealing mold.
Figure 6:
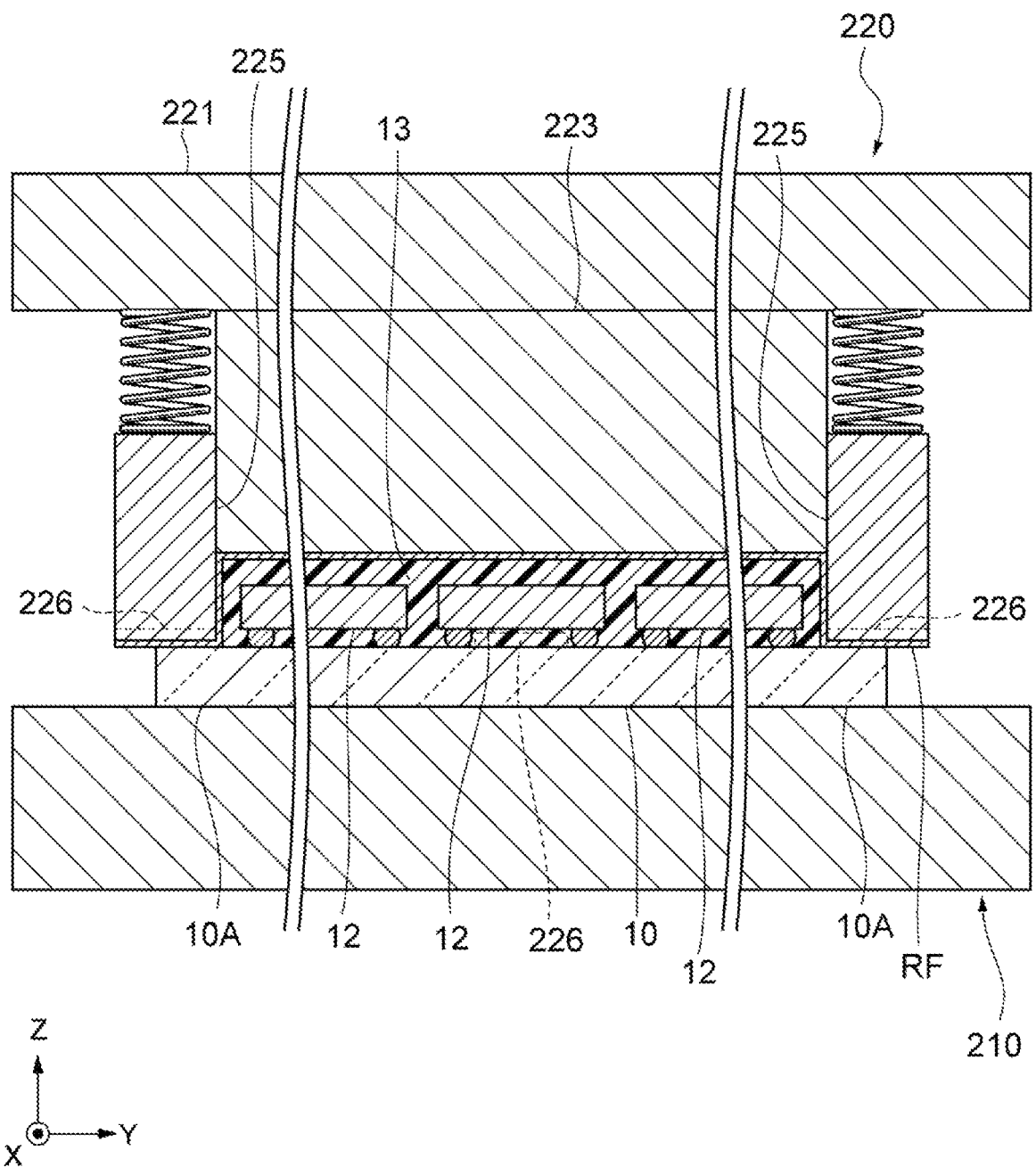
FIG. 6 is a cross-sectional view schematically showing a resin filled in a cavity by heating and pressurizing.

Next, a method for manufacturing a resin-sealed product using the resin sealing apparatus 1 according to the present embodiment is described with reference to FIGS. 3 to 6. FIG. 3 is a flowchart showing a method for manufacturing a resin-sealed product using the resin sealing apparatus according to the first embodiment. FIG. 4 is a cross-sectional view schematically showing a resin on the workpiece immediately after being set inside the resin sealing mold. FIG. 5 is a cross-sectional view schematically showing a resin being spread by the resin sealing mold. FIG. 6 is a cross-sectional view schematically showing a resin filled in the cavity by heating and pressurizing. Note that, for simplicity of explanation, the chamber block 227 is not shown in FIGS. 4 to 6.

First, the arrangement information of the elements on the workpiece 10 is acquired (S11). For example, the acquisition unit 110 acquires the arrangement information of the elements 12 arranged in the first direction X and the second direction Y by imaging the workpiece 10 and analyzing the image of the workpiece 10.

Next, the resin supply pattern is calculated based on the arrangement information of the elements 12 (S12). For example, the calculation unit 130 reads the registered arrangement information by the acquisition unit 110, and calculates desired moving route, moving speed, and the like of the supply unit 120 according to rules (for example, the linear path 14 passes through the region between the elements 12, the linear path 14 extends to an element 12 at the outermost edge of the workpiece 10, or the like) registered in advance. Moreover, when calculating the linear path 14, structural information of the cavity 201 may be used. The structural information includes the inner peripheral dimension of the cavity, the depth of the cavity at the time of final molding, and the like. The calculated resin supply pattern has a plurality of linear paths 14 extending along the first direction X. In addition, in a plan view of the workpiece 10 from above, the region 19 between the mutually adjacent linear paths 14 in the plurality of linear paths 14 is opened to the outside of the workpiece 10.

Then, the resin 13 is supplied onto the workpiece 10 along the resin supply pattern (S13). Here, the supply unit 120 is moved by driving the drive unit 140 based on the resin supply pattern in a state that the workpiece 10 is positioned in the first direction X, the second direction Y, and the rotation direction centered on the Z axis. When the supply unit 120 moves to a supply start position (one end of the resin supply pattern), the pinch valve 123 is opened while pushing the pusher 122 against the syringe 121, and the supply of the resin 13 from the supply unit 120 is started. When the supply unit 120 that continues to supply the resin 13 is moved to a supply end position (the other end of the resin supply pattern), the pinch valve 123 is closed while the pushing of the pusher 122 against the syringe 121 is stopped, and the supply of the resin 13 from the supply unit 120 is ended.

Subsequently, the release film RF is set in the upper mold 220, and the workpiece 10 is set in the lower mold 210. The release film RF is carried into the opened resin sealing mold 200 so as to cover the cavity 201. The release film RF may be supplied, for example, by being fed out from a roll of unused film arranged in front of the mold and wound by a roll of used film arranged at the rear of the mold. After discharging air from a gap between the cavity piece 223 and the clamper 225 and an intake hole in the upper mold 220 (not shown), the release film RF is adsorbed to the upper mold 220. In addition, the workpiece 10 to which the resin 13 is supplied is carried into the opened resin sealing mold 200. The air is discharged from the intake hole in the upper mold 220 (not shown), and the workpiece 10 is adsorbed to the lower mold 210.

Next, the resin 13 is spread by mold clamping (S15).

First, as shown in FIG. 4, for example, the external region 10A of the workpiece 10 having the flip-chip mounted elements 12 and the substrate 11 is sandwiched between the clamper 225 and the lower mold 210. At this time, although not shown, the sealing ring 203 is sandwiched between the chamber block 227 and the lower mold 210. A shallow dug portion arranged on the lower surface of the clamper 225 forms the air vent 226 between the lower mold 210 and the clamper 225 (between the workpiece 10 and the clamper 225), and the space (the cavity 201) inside the clamper 225 and the space outside the clamper 225 are connected through the air vent 226. Accordingly, the air in the mold shown in FIG. 4 is discharged to the outside of the chamber block 227.

Next, as shown in FIG. 5, the resin 13 is spread by the cavity piece 223 in the depressurized mold. At this time, the resin 13 can enter the gap between the element 12 and the release film RF as well as the gap between the workpiece 10 and the flip-chip mounted element 12 to perform underfill. On the workpiece 10, although the region between the resins 13 in the paths adjacent to each other is narrowed, it is possible to prevent the linearly applied resin 13 from coming into contact with each other before the filling of the resin 13 is completed. Thus, the air can be discharged from the air vent 226.

Then, the cavity piece 223 is relatively lowered by performing mold clamping, and as shown in FIG. 6, the cavity 201 is filled with the resin 13. Accordingly, the resin 13 is filled up to the front of the air vent 226. Here, by softening the resin 13 while heating it with a heater (not shown) and pressurizing the resin 13 with the cavity piece 223, the resin 13 is filled (molded) in the cavity, and at the same time, the gap between the workpiece 10 and the flip-chip mounted element 12 is underfilled with the resin 13.

Finally, the resin 13 is cured by continuing heating and pressurizing (curing) for a predetermined time (S16). In this way, the sealing of the workpiece 10 with resin is completed.

According to the configuration described in the above embodiment, the resin supply pattern has a plurality of the linear paths 14 extending parallel to the first direction X, and when the workpiece 10 is viewed in the plan view from above, the region 19 between the mutually adjacent linear paths 14 in the plurality of linear paths 14 is opened to the outside of the workpiece 10. Accordingly, when the resin 13 is spread in the resin sealing mold 200 so as to seal the workpiece 10 with resin, the air remaining inside the resin sealing mold 200 and the gas generated from the resin 13 can be discharged through the region 19. Therefore, it is possible to suppress the occurrence of defects (for example, air traps or non-filling) due to the containment of air or the like caused by the resin 13. Accordingly, when it is difficult for the resin 13 to enter a fine portion of the workpiece 10 due to the presence of air or the like, for example, the filling of the resin 13 into the gap between the flip-chip mounted element 12 and the substrate 11 is promoted and the occurrence of poor filling can be suppressed.

The first linear path 14A is connected to the second linear path 14B on one end side of the first direction X on the workpiece 10, and the second linear path 14B is connected to the third linear path 14C on the other end side of the first direction X on the workpiece 10. In addition, the resin supply pattern is one continuous linear line. Accordingly, by having a shape in which adjacent linear paths are not connected to each other at least on either end portion side, the resin 13 can be supplied with one stroke while discharging air. Therefore, the resin 13 can be efficiently supplied onto the workpiece 10 by continuously discharging the resin 13 without the need for stopping the discharge of the resin 13 during the supply.

The resin supply pattern extends over the region between the adjacent elements 12 in the second direction Y. Accordingly, the resin 13 can efficiently enter the gap between the substrate 11 and the element 12 as well as the gap between the elements 12, and the occurrence of sealing failure can be suppressed.

The linear path 14 extends to the element 12 at the outermost edge of the workpiece 10, and the relay path 15 extends on an element 12 at the outermost edge. Accordingly, in a space over the external region 10B of the workpiece 10 in which the required amount of the resin 13 is large due to the absence of the elements 12, the occurrence of defects caused by a shortage of the resin 13 can be suppressed.

The air vent 226 is arranged on the extension line of the region 19 between the mutually adjacent linear paths 14. Accordingly, the air vent is not blocked until the region 19 between the mutually adjacent linear paths 14 is completely filled with the resin 13, and air can be discharged from the inside of the resin sealing mold 200.

Hereinafter, a variation example of the resin supply pattern and a configuration of a resin sealing apparatus according to another embodiment of the present invention are described. It should be noted that the matters common to the first embodiment can also be applied to each of the following aspects, the description thereof is omitted, and only the differences are described. In particular, the same configurations are designated by the same reference signs, and the same configurations and the same actions and effects are not mentioned sequentially.

FIGS. 7 to 11 show schematic plan views of resin supply patterns according to different variation examples. As shown in FIGS. 7 to 11, external regions 20A, 30A, 40A, 50A, 60A are respectively referred to a region sandwiched by the resin sealing mold; external regions 20B, 30B, 40B, 50B, 60B are respectively referred to a region closer to the element 22, 32, 42, 52, 62 side than the external regions 20A, 30A, 40A, 50A, 60A; reference numerals 21, 31, 41, 51, 61 represent a substrate; reference numerals 23, 33, 43, 53, 63 represent a resin; reference numerals 25, 35, 45, 55, 65 represent a relay path; and reference numerals 29, 39, 49, 59, 69 represent region between the linear paths.

Figure 7:
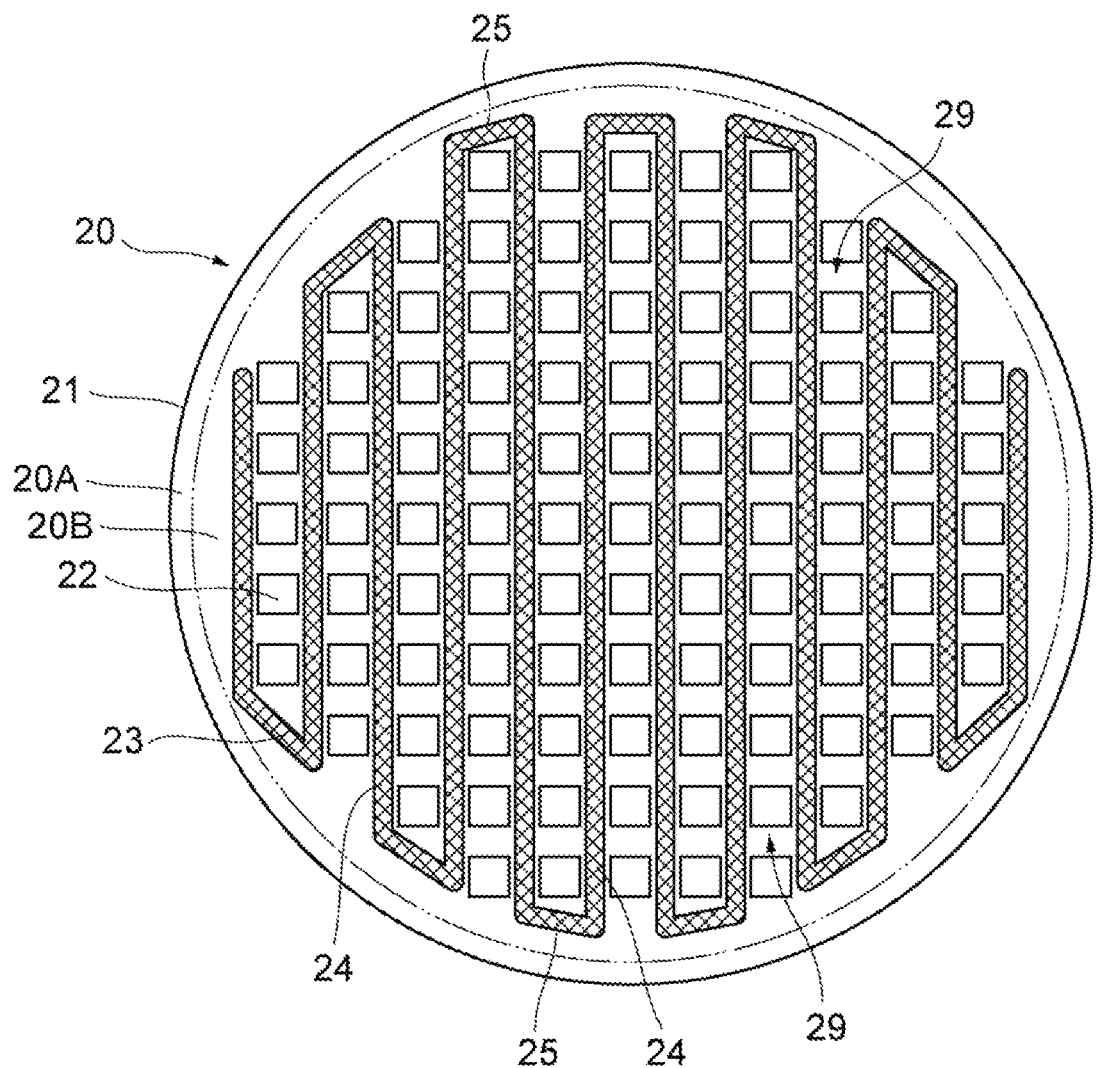
FIG. 7 is a plan view schematically showing a resin supply pattern according to a variation example.
Figure 7:
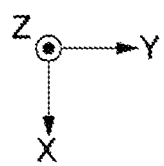

As shown in FIG. 7, when elements 22 are mounted apart from each other in a workpiece 20, the resin 13 can also be applied on a substrate 21 between the elements 22. Specifically, in a plan view of the workpiece 20 from above, a linear path 24 is arranged between the elements 22 adjacent in the second direction Y and extends over an outer region of the element 22. Accordingly, because a resin 23 is supplied onto the substrate 21, the resin 23 easily enters a fine space such as a gap between the substrate 21 and the element 22, or the like.

A relay path 25 extends to the outside of the element 22 and an external region 20B. Accordingly, for example, even if the workpiece 20 has a low density of the occupied area of the elements 22, it is possible to suppress occurrence of defects caused by a shortage of the resin 23 in a space over the external region 20B of the workpiece 20 in which the required amount of the resin 23 is large due to the absence of the elements 22.

Figure 8:
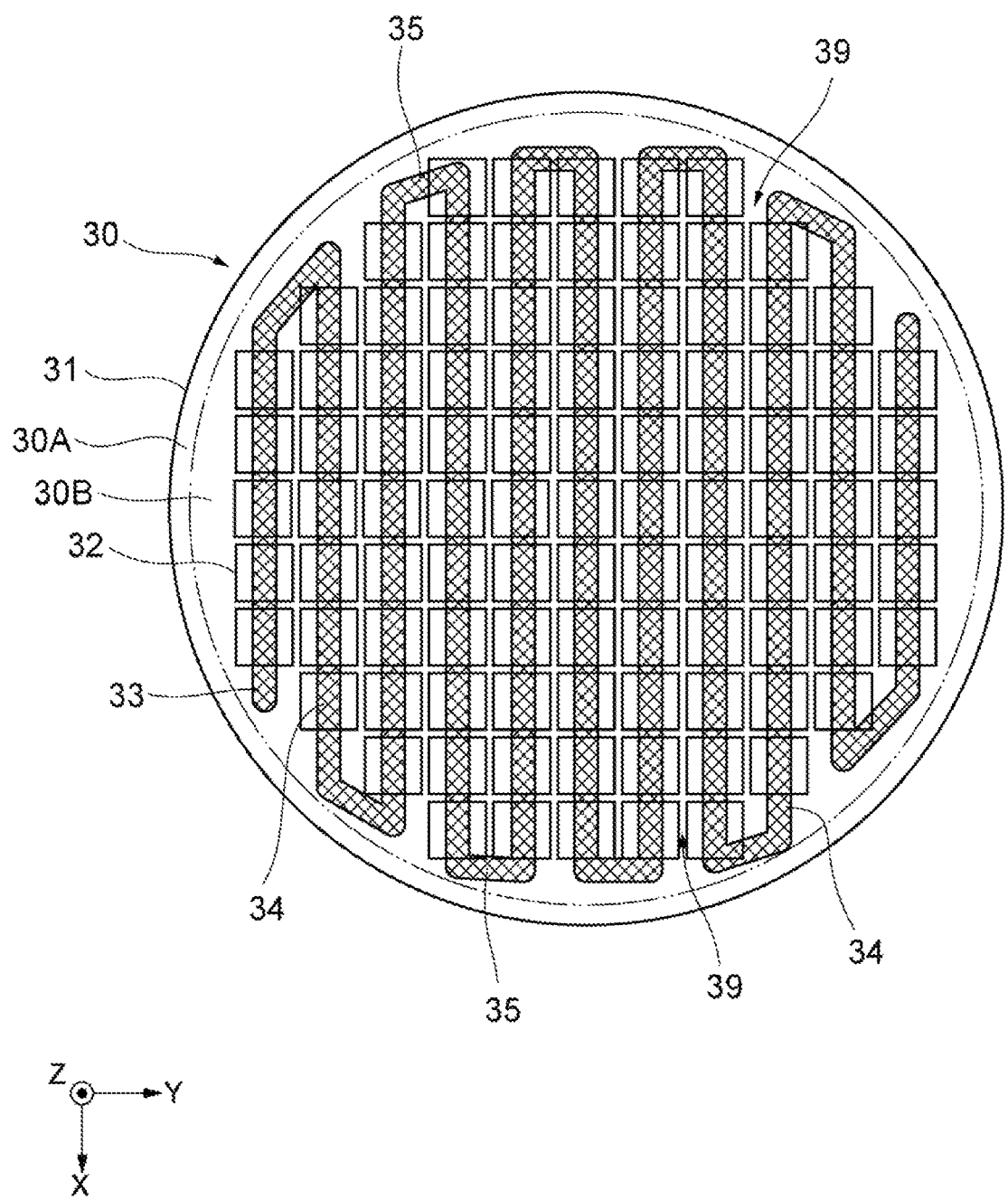
FIG. 8 is a plan view schematically showing a resin supply pattern according to another variation example.

As shown in FIG. 8, in a plan view of a workpiece 30 from above, a linear path 34 extends on elements 32 arranged in the first direction X. The linear path 34 extends so as to pass through the center of the element 32 in the second direction Y. Accordingly, an end portion of the element 32 on the side of the second direction Y is located in a region 39 between the mutually adjacent linear paths 34. Accordingly, because the region between the elements 32 adjacent in the second direction Y that does not have the element 32 arranged therein functions as a flow passage for discharging air, air can be discharged efficiently and occurrence of defects caused by poor filling can be suppressed.

Figure 9:
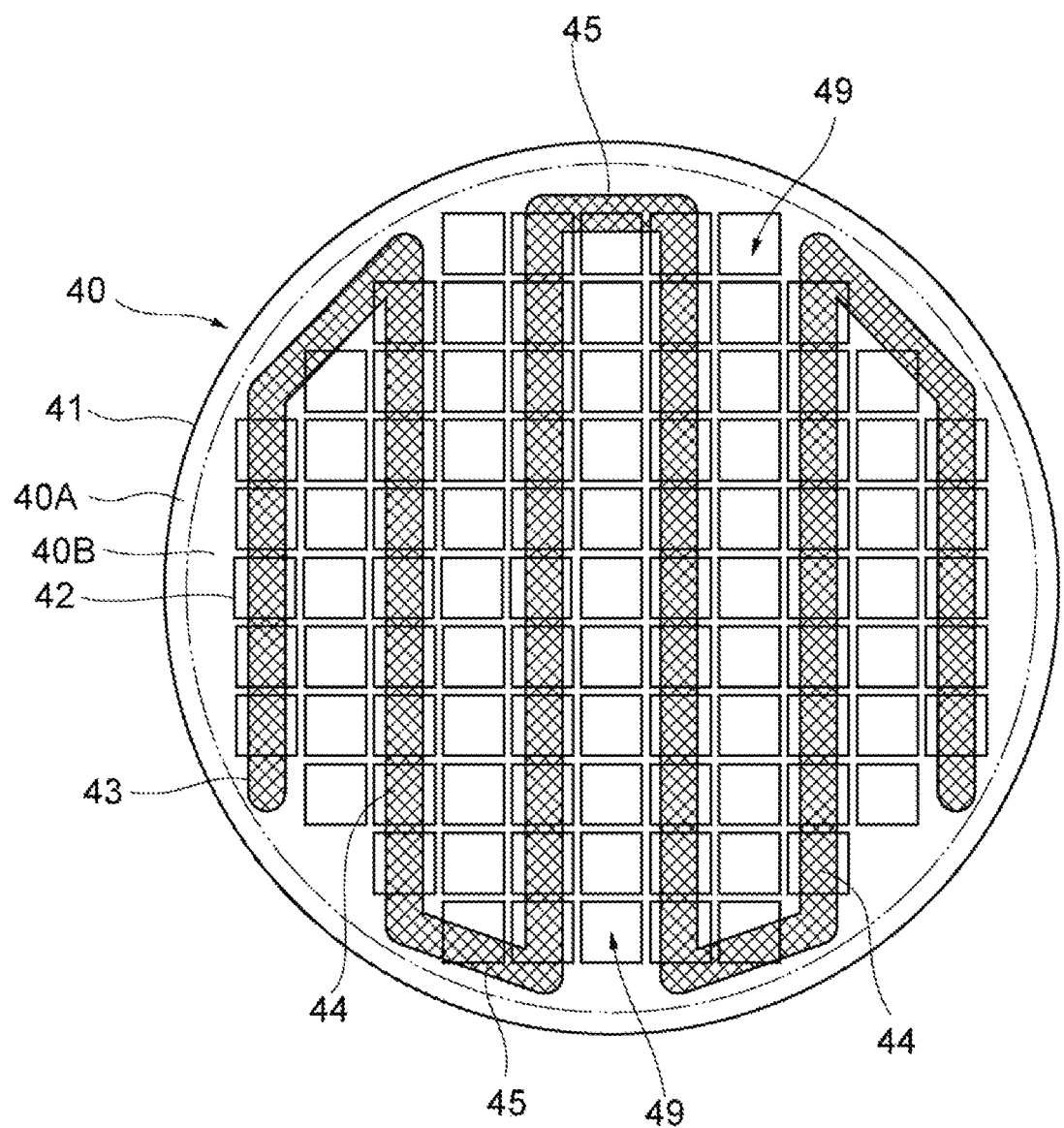
FIG. 9 is a plan view schematically showing a resin supply pattern according to another variation example.

As shown in FIG. 9, an interval between linear paths 44 can be arbitrarily set. For example, in a plan view of a workpiece 40 from above, the linear paths 44 are arranged in the second direction Y at intervals of one row or more of elements 42, and extend on the elements 42 arranged in the first direction X. In other words, at least a row of the elements 42 is arranged in a region 49 between the mutually adjacent linear paths 44. The linear path 44 may extend over a region between the elements 42 adjacent in the second direction Y. For example, as compared with a configuration in which the resin 13 is shared corresponding to all the rows of the elements 42, the length of the supply path of the resin 13 can be shortened and the resin 13 can be supplied in a short time. In addition, when the required amount of the resin 13 is small, the amount of supply of the resin 13 can be adjusted by widening the interval between the linear paths 44.

Figure 10:
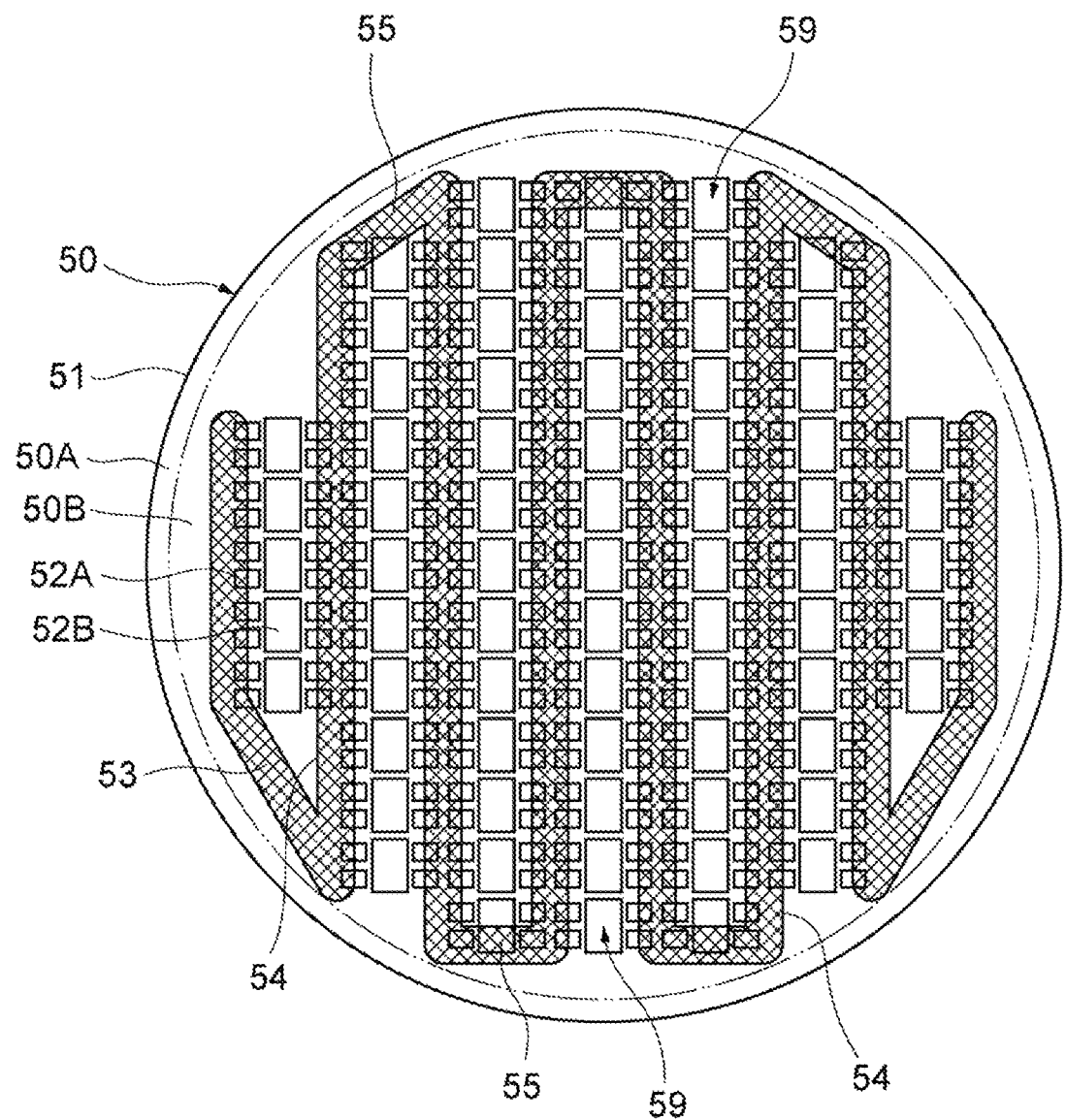
FIG. 10 is a plan view schematically showing a resin supply pattern according to another variation example.

As shown in FIG. 10, when a plurality of types of elements 22 are mounted on the workpiece 20, the resin 13 can be applied according to the mounted elements 22. Specifically, elements 52A and elements 52B larger than the elements 52A are arranged on a workpiece 50. In a plan view of the workpiece 50 from above, a linear path 54 is located in a region between the elements 52B and extends on the elements 52A. Accordingly, a resin 53 easily enters a fine portion of the workpiece 50, and occurrence of defects caused by poor filling can be suppressed.

Figure 11:
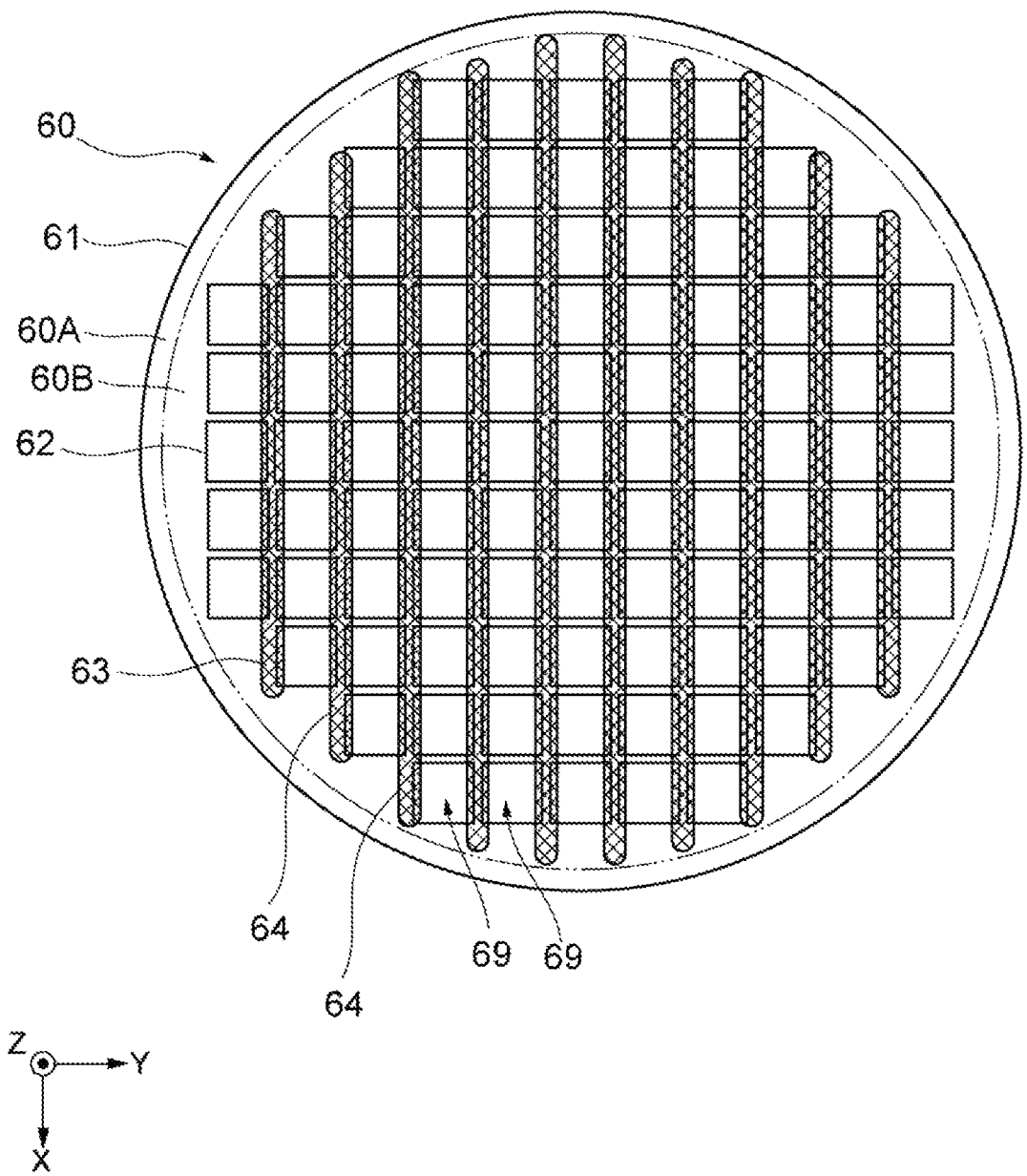
FIG. 11 is a plan view schematically showing a resin supply pattern according to another variation example.

As shown in FIG. 11, in a plan view of a workpiece 60 from above, a region 69 between mutually adjacent linear paths 64 is opened to the outside of the workpiece 60 toward both positive and negative direction sides of the first direction X. The width of the linear path 64 in the second direction Y is, for example, constant. However, the width of the center of the linear path 64 in the first direction X may be larger than the width of the end portion in the first direction X. In addition, the mutually adjacent linear paths 64 may be connected at the center in the first direction X.

The resin supply patterns of FIGS. 2 and 7 to 11 described above can be appropriately combined and applied to one workpiece.

Figure 12:
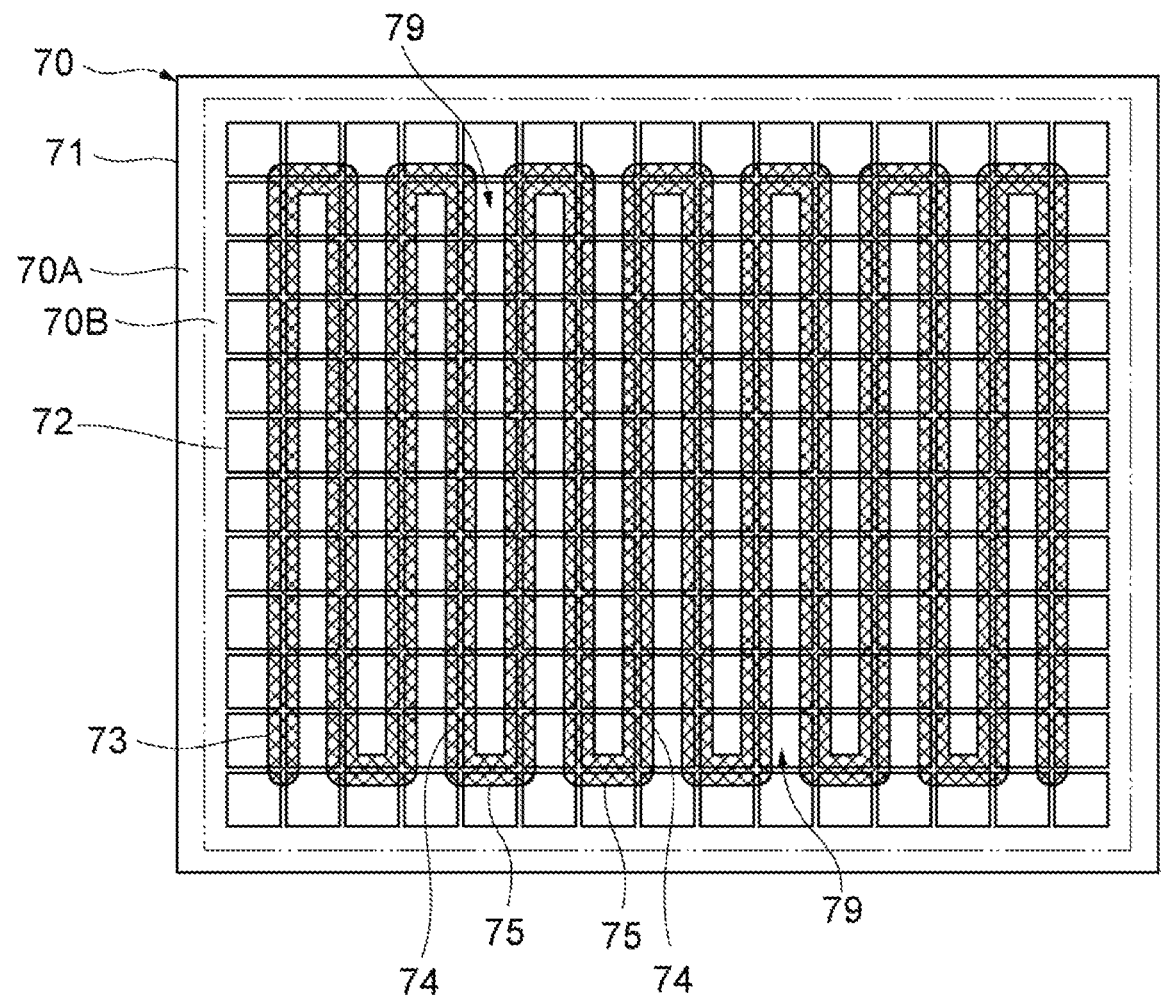
FIG. 12 is a plan view schematically showing a resin supply pattern according to another variation example.
Figure 12:
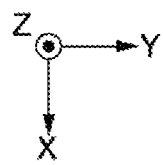

FIG. 12 is a variation example of the workpiece, and shows a rectangular workpiece 70 for use in panel level packaging (PLP). As shown in FIG. 12, in a plan view of the workpiece 70 from above, a substrate 71 has a rectangular shape having a pair of short sides and a pair of long sides. A linear path 74 extends along the short sides of the substrate 71, and more specifically, extends parallel to the short sides of the substrate 71. Accordingly, as compared with a configuration in which the linear path 74 extends along the long sides of the substrate 71, the length of a region 79 between the mutually adjacent linear paths 74 is shortened, and the region 79 is blocked due to the contact between resins 73 in the linear path 74 during the process of spreading the resins 73 on the region 79, and thus air can be suppressed from being caught in the resin 73. Further, the variation example shown in FIG. 12 can be appropriately applied to each of the above resin supply patterns. As shown in FIG. 12, external region 70A is referred to a region sandwiched by the resin sealing mold; external regions 70B is referred to a region closer to the element 72 side than the external region 70A; and reference numeral 75 represent a relay path.

Second Embodiment

Figure 13:
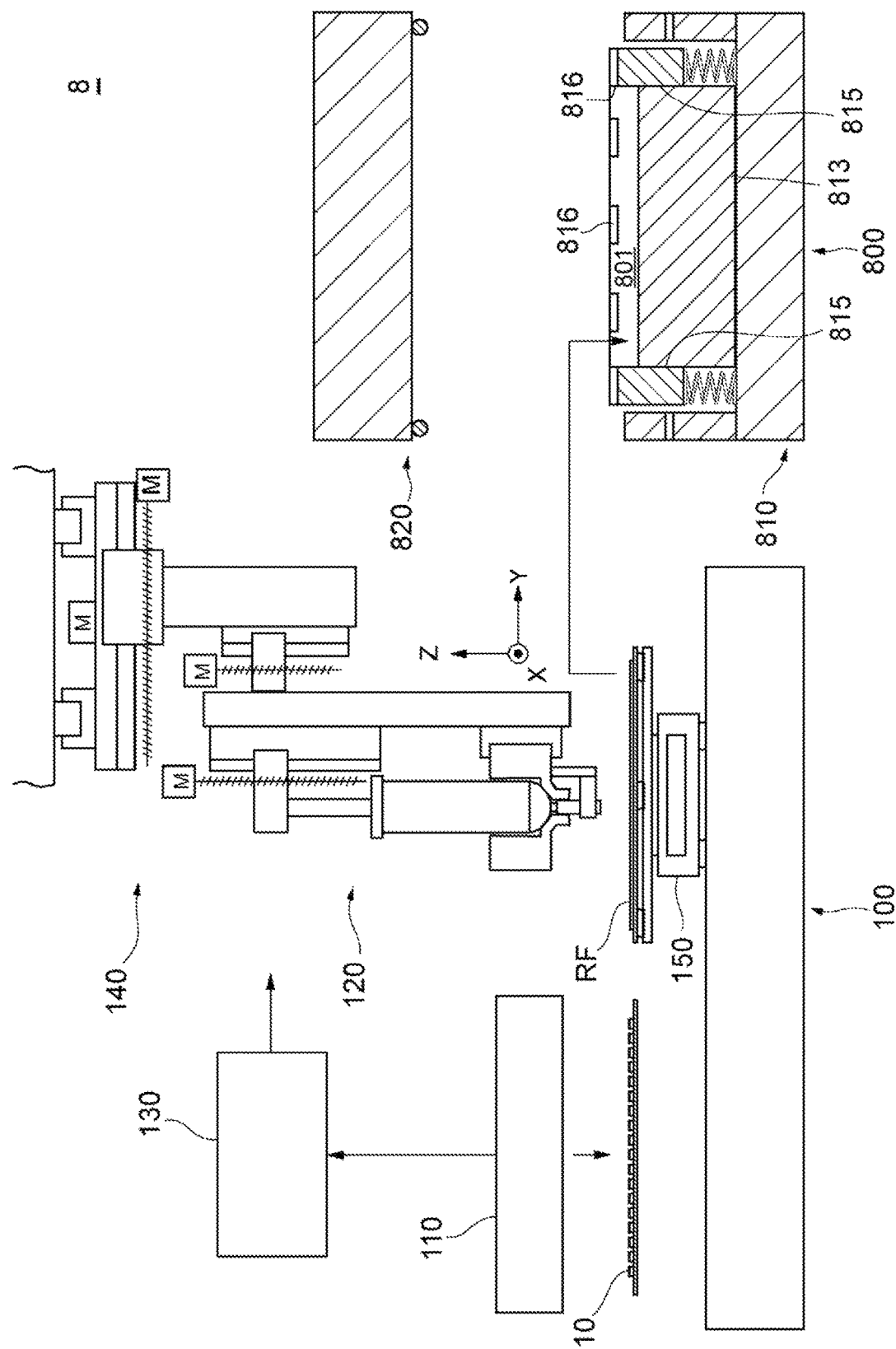
FIG. 13 is a diagram schematically showing a configuration of a resin sealing apparatus according to a second embodiment.

A configuration of a resin supply pattern according to a second embodiment is described with reference to FIG. 13. FIG. 13 is a diagram schematically showing a configuration of a resin sealing apparatus according to the second embodiment.

In the present embodiment, a release film RF is placed on the stage 150, and the drive unit 140 moves the supply unit 120 based on arrangement information of the elements 12 on the workpiece 10 acquired by the acquisition unit 110, and the resin 13 is supplied onto the release film RF. A resin sealing mold 800 has a lower mold cavity structure which includes a lower mold 810 that has a cavity 801 and an upper mold 820. The release film RF is set in the lower mold 810, and the workpiece 10 is set in the upper mold 820. The lower mold 810 has a cavity piece 813 and a clamper 815 constituting the cavity 801, and an air vent 816 is arranged on the upper surface of the clamper 815 (the surface facing the upper mold 820) when the mold is clamped.

Figure 14:
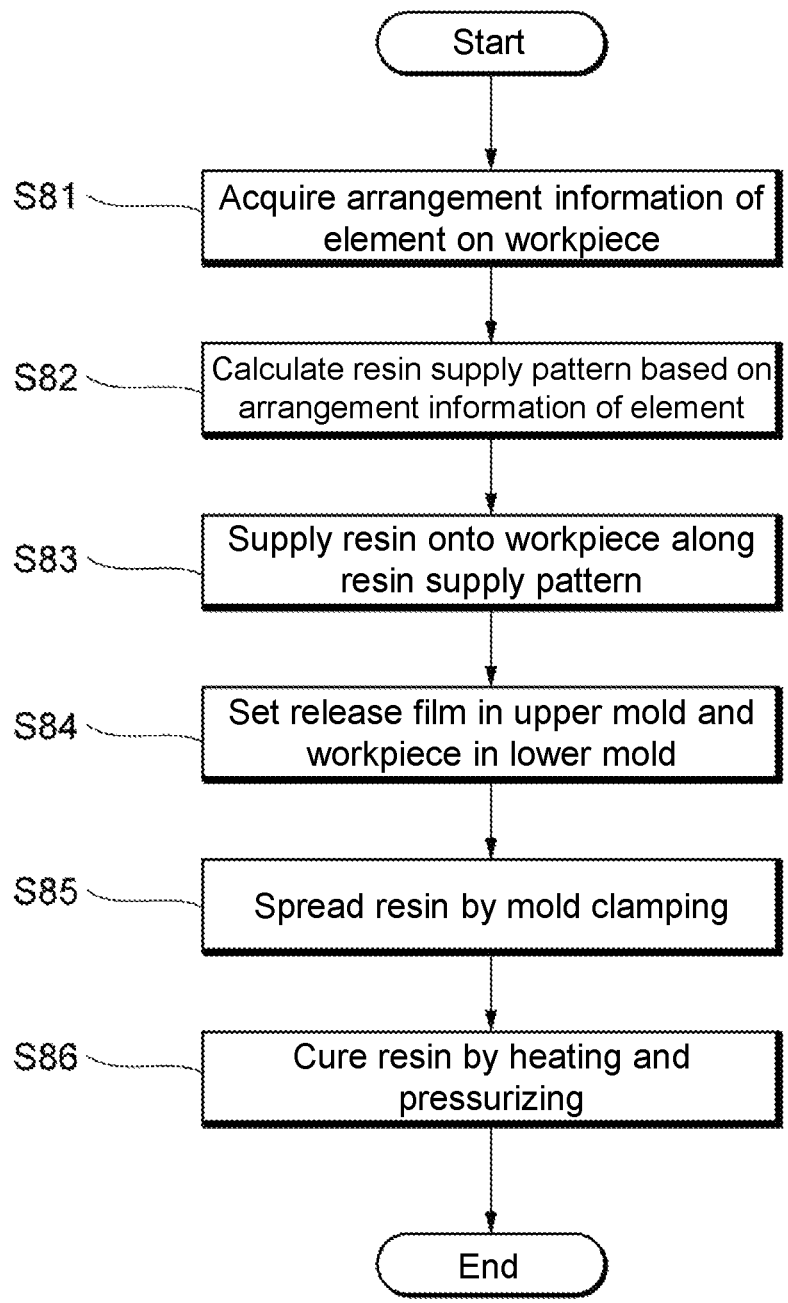
FIG. 14 is a flowchart showing a method for manufacturing a resin-sealed product using the resin sealing apparatus according to the second embodiment.

Next, a method for manufacturing a resin-sealed product using a resin sealing apparatus 8 according to the present embodiment is described with reference to FIG. 14. FIG. 13 is a diagram schematically showing a configuration of the resin sealing apparatus according to the second embodiment. FIG. 14 is a flowchart showing a method for manufacturing a resin-sealed product using the resin sealing apparatus according to the second embodiment.

First, the arrangement information of the elements 12 on the workpiece 10 is acquired (S81). Next, the resin supply pattern is calculated based on the arrangement information of the elements 12 (S82). The resin supply pattern is calculated by inverting the arrangement information of the elements 12 so that the resin 13 on the release film RF is set on a region between the elements 12 adjacent in the second direction Y and/or on the elements 12 arranged in the first direction X when the elements 12 face the workpiece 10. Then, the resin 13 is supplied onto the release film RF along the resin supply pattern (S83). Next, the release film RF is set in the lower mold 810, and the workpiece 10 is set in the upper mold 820 (S84). At this time, the release film RF and the workpiece 10 are positioned in the first direction X, the second direction Y, and the rotation direction centered on the Z axis, which can obtain effects similar to those obtained by supplying the resin 13 applied on the release film RF to a position corresponding to the elements 12 on the workpiece 10. Subsequently, by closing the mold, the resin 13 is brought into contact with the elements 12 and the substrate 11 while the air is discharged from the chamber of the mold, and the resin 13 is spread by mold clamping (S85). The resin 13 on the release film RF set in the lower mold 810 is pressed against the workpiece 10 set in the upper mold 820, and the resin 13 is spread while being sandwiched between the workpiece 10 and the release film RF. Here, it is considered that by discharging air before bringing the resin 13 into contact with the elements 12 or the substrate 11, air traps can be prevented even if a closed space is formed by the contact between the resins 13 on the release film RF. However, when the resin 13 is spread, the gas generated by heating the resin 13 remains, which may cause poor filling. In contrast, by arranging the path for discharging gas as in the present embodiment, the occurrence of defects such as an air trap caused by gas can be suppressed. Subsequently, the resin 13 is cured by heating and pressurizing (S86). In this way, the same effect as that of the above-described present invention can be obtained even when the mold has the lower mold cavity structure.

Further, in the aspect described in the embodiment, any one or an appropriate combination of a plurality of the resin supply patterns described in the first embodiment can be applied.

As described above, according to one aspect of the present invention, it is possible to provide a resin supply apparatus, a resin sealing apparatus, and a method for manufacturing a resin-sealed product, which can suppress occurrence of defects.

A resin supply apparatus according to one aspect of the present invention is a resin supply apparatus for supplying a resin onto a workpiece on which elements are arranged in a first direction and a second direction intersecting the first direction, respectively. The resin supply apparatus includes: an acquisition unit for acquiring arrangement information of the elements on the workpiece; a supply unit for supplying a resin onto the workpiece; a calculation unit for calculating a resin supply pattern based on the arrangement information; and a drive unit for moving at least one of the workpiece and the supply unit relative to the other along the resin supply pattern. The resin supply pattern has a plurality of linear paths extending along the first direction, and a region between mutually adjacent linear paths in the plurality of linear paths is opened to the outside of the workpiece.

According to this aspect, because the region between the adjacent linear paths functions as a flow passage for discharging air, entrainment of air or gas can be suppressed when the resin is spread, and occurrence of defects caused by poor filling can be suppressed.

In the above aspect, the plurality of linear paths may extend parallel to the first direction.

In the above aspect, the plurality of linear paths have a first linear path, a second linear path adjacent to the first linear path, and a third linear path adjacent to the second linear path. The first linear path may be connected to the second linear path on one end side of the first direction, and the second linear path may be connected to the third linear path on the other end side of the first direction.

In the above aspect, the resin supply pattern may be one continuous linear line.

In the above embodiment, at least one of the plurality of linear paths may extend over a region between the elements adjacent in the second direction.

In the above embodiment, at least one of the plurality of linear paths may extend on the elements arranged in the first direction.

In the above aspect, the mutually adjacent linear paths in the plurality of linear paths may extend to an element at the outermost edge of the workpiece.

In the above aspect, the mutually adjacent linear paths in the plurality of linear paths may extend to the elements on the inner side of the element at the outermost edge of the workpiece except for extending to the element at the outermost edge.

In the above embodiment, the elements on the workpiece may include two or more types of elements having different sizes, and the plurality of linear paths may extend on elements on the workpiece that are smaller than the other elements.

In the above aspect, the supply unit may be a dispenser that supplies a liquid resin.

A resin sealing apparatus according to one aspect of the present invention includes the resin supply apparatus according to any one of the above aspects, and a resin sealing mold for sealing the elements on the workpiece with resin. The resin sealing mold has an upper mold provided with a cavity in which a resin is filled and a lower mold in which the workpiece is set, and the clamped resin sealing mold has a plurality of air vents for discharging air inside the cavity between the upper mold and the lower mold.

In the above embodiment, at least one of the plurality of air vents may be arranged on an extension line of a region between the mutually adjacent linear paths in the plurality of linear paths.

According to this aspect, when the mold is clamped and the resin is heated and pressurized, the air vents arranged on the extension line of the region between the linear paths are not blocked until the region between the mutually adjacent linear paths is completely filled with resin, and air can be discharged from the inside of the resin sealing mold.

A method for manufacturing a resin-sealed product according to one aspect of the present invention includes supplying a resin onto a workpiece on which elements are arranged in a first direction and a second direction intersecting the first direction, respectively. In this method for manufacturing a resin-sealed product, the supply of a resin onto the workpiece includes: acquiring arrangement information of the elements on the workpiece; calculating a resin supply pattern based on the arrangement information; and supplying the resin onto the workpiece along the resin supply pattern. The resin supply pattern has a plurality of linear paths extending along the first direction, and a region between mutually adjacent linear paths in the plurality of linear paths is opened to the outside of the workpiece.

According to this aspect, because the region between the adjacent linear paths functions as a flow passage for discharging air, entrainment of air or gas can be suppressed when the resin is spread, and occurrence of defects caused by poor filling can be suppressed.

A resin supply apparatus according to one aspect of the present invention is a resin supply apparatus for supplying, onto a release film, a resin used for sealing a workpiece on which elements are arranged in a first direction and a second direction intersecting the first direction, respectively. The resin supply apparatus includes: an acquisition unit for acquiring arrangement information of the elements on the workpiece; a supply unit for supplying a resin onto the release film; a calculation unit for calculating a resin supply pattern based on the arrangement information; and a drive unit for moving at least one of the release film and the supply unit relative to the other along the resin supply pattern. The resin supply pattern has a plurality of linear paths extending along the first direction, and a region between mutually adjacent linear paths in the plurality of linear paths is opened to the outside of the release film.

According to this aspect, because the region between the adjacent linear paths functions as a flow passage for discharging air, entrainment of air or gas can be suppressed when the resin is spread, and occurrence of defects caused by poor filling can be suppressed.

A resin sealing apparatus according to one aspect of the present invention includes the resin supply apparatus according to the above aspect and a resin sealing mold for sealing the elements on the workpiece with resin. The resin sealing mold has a lower mold in which a cavity for filling a resin therein is arranged and the release film is set, and an upper mold in which the workpiece is set, and air vents for discharging air in the cavity are formed between the upper mold and the lower mold.

According to this aspect, when the mold is clamped and the resin is heated and pressurized, the air vents arranged on the extension line of the region between the linear paths are not blocked until the region between the mutually adjacent linear paths is completely filled with resin, and air can be discharged from the inside of the resin sealing mold.

A method for manufacturing a resin-sealed product according to one aspect of the present invention includes supplying, onto a release film, a resin used for sealing a workpiece on which elements are arranged in a first direction and a second direction intersecting the first direction, respectively. In this method for manufacturing a resin-sealed product, the supplying of the resin onto the release film includes: acquiring arrangement information of the elements on the workpiece; calculating a resin supply pattern based on the arrangement information; supplying the resin onto the release film along the resin supply pattern; and pressing the resin on the release film against the workpiece. The resin supply pattern has a plurality of linear paths extending along the first direction, and a region between the mutually adjacent linear paths in the plurality of linear paths is opened to the outside of the workpiece.

According to this aspect, because the region between the adjacent linear paths functions as a flow passage for discharging air, entrainment of air or gas can be suppressed when the resin is spread, and occurrence of defects caused by poor filling can be suppressed.

EFFECT

According to the present invention, it is possible to provide a resin supply apparatus, a resin sealing apparatus, and a method for manufacturing a resin-sealed product, which can suppress occurrence of defects.

The embodiments described above are for purposes of facilitating the understanding of the present invention, and should not be interpreted as limiting the present invention. Each element included in the embodiment and its arrangement, material, condition, shape, size, and the like are not limited to the illustrated ones, and can be changed as appropriate. In addition, the configurations shown in different embodiments can be partially replaced or combined.

What is claimed is:

1. A resin supply apparatus for supplying a resin onto a workpiece on which elements are arranged in a first direction and a second direction intersecting the first direction, respectively, the resin supply apparatus comprising:
   an acquisition unit configured to acquire an arrangement information of the elements on the workpiece by imaging the workpiece and analyzing the image of the workpiece;
   a supply unit configured to supply a resin onto the workpiece;
   a calculation unit configured to calculate a resin supply pattern by reading the registered arrangement information by the acquisition unit, and to calculate a desired moving pattern of the supply unit; and
   a drive unit configured to move at least one of the workpiece and the supply unit relative to the other along the resin supply pattern,
   wherein the resin supply pattern has a plurality of linear paths extending along the first direction, and
   a region between mutually adjacent linear paths in the plurality of linear paths is opened to the outside of the workpiece.

2. The resin supply apparatus according to claim 1, wherein the plurality of linear paths extend parallel to the first direction.

3. The resin supply apparatus according to claim 1, wherein the plurality of linear paths have a first linear path, a second linear path adjacent to the first linear path, and a third linear path adjacent to the second linear path,
   the first linear path is connected to the second linear path on one end side of the first direction, and
   the second linear path is connected to the third linear path on the other end side of the first direction.

4. The resin supply apparatus according to claim 1, wherein the resin supply pattern is one continuous linear line.

5. The resin supply apparatus according to claim 1, wherein at least one of the plurality of linear paths extends over a region between the elements adjacent in the second direction.

6. The resin supply apparatus according to claim 1, wherein at least one of the plurality of linear paths extends on the elements arranged in the first direction.

7. The resin supply apparatus according to claim 1, wherein at least one of the plurality of linear paths extends to an element at the outermost edge of the workpiece.

8. The resin supply apparatus according to claim 1, wherein the mutually adjacent linear paths in the plurality of linear paths extend to the elements on the inner side of the element at the outermost edge of the workpiece except for extending to the element at the outermost edge.

9. The resin supply apparatus according to claim 1, wherein the elements on the workpiece comprise two or more types of elements having different sizes, and
   the plurality of linear paths extend on elements on the workpiece that are smaller than the other elements.

10. The resin supply apparatus according to claim 1, wherein the supply unit is a dispenser that supplies a liquid resin.

11. A resin sealing apparatus comprising:
    the resin supply apparatus according to claim 1; and
    a resin sealing mold for sealing the elements on the workpiece with resin,
    the resin sealing mold has an upper mold provided with a cavity in which a resin is filled and a lower mold in which the workpiece is set, and
    the clamped resin sealing mold has a plurality of air vents for discharging air inside the cavity between the upper mold and the lower mold.

12. The resin sealing apparatus according to claim 11, wherein at least one of the plurality of air vents is arranged on an extension line of a region between the mutually adjacent linear paths in the plurality of linear paths.

13. A resin supply apparatus for supplying, onto a release film, a resin used for sealing a workpiece on which elements are arranged in a first direction and a second direction intersecting the first direction, respectively, the resin supply apparatus comprising:

an acquisition unit configured to acquire arrangement information of the elements on the workpiece by imaging the workpiece and analyzing the image of the workpiece;

a supply unit configured to supply a resin onto the release film;

a calculation unit configured to calculate a resin supply pattern by reading the registered arrangement information by the acquisition unit, and to calculate a desired moving pattern of the supply unit; and a drive unit configured to move at least one of the release film and the supply unit relative to the other along the resin supply pattern, wherein the resin supply pattern has a plurality of linear paths extending along the first direction, and a region between mutually adjacent linear paths in the plurality of linear paths is opened to the outside of the release film.

14. A resin sealing apparatus comprising:

the resin supply apparatus according to claim 13; and a resin sealing mold for sealing the elements on the workpiece with resin, wherein the resin sealing mold has a lower mold in which a cavity for filling a resin therein is arranged and the release film is set, and an upper mold in which the workpiece is set, and air vents for discharging air in the cavity are formed between the upper mold and the lower mold.

\* \* \* \* \*